(12) United States Patent
Junk et al.

(10) Patent No.: US 11,945,346 B2
(45) Date of Patent: Apr. 2, 2024

(54) VEHICLE SEAT CRASH SECURING DEVICE AND VEHICLE SEAT

(71) Applicants: Faurecia Autositze GmbH, Stadthagen (DE); ZF Automotive Germany GmbH, Alfdorf (DE)

(72) Inventors: Oliver Junk, Porta Westfalica (DE); Dimitri Unrau, Niedernwöhren (DE); Dominik Seitzer, Waldstetten (DE); Jörg Meyer, Alfdorf-Adelstetten (DE)

(73) Assignee: Faurecia Autositze GmbH, Hannover (DE)

( * ) Notice: Subject to any disclaimer, the term of this patent is extended or adjusted under 35 U.S.C. 154(b) by 176 days.

(21) Appl. No.: 17/737,092

(22) Filed: May 5, 2022

(65) Prior Publication Data

US 2022/0371485 A1 Nov. 24, 2022

(30) Foreign Application Priority Data

May 6, 2021 (DE) ...................... 10 2021 111 783.6

(51) Int. Cl.
 *B60N 2/42* (2006.01)
 *B60N 2/16* (2006.01)
 *B60R 22/18* (2006.01)

(52) U.S. Cl.
 CPC ............. *B60N 2/43* (2013.01); *B60N 2/1685* (2013.01); *B60R 22/18* (2013.01)

(58) Field of Classification Search
 None
 See application file for complete search history.

(56) References Cited

U.S. PATENT DOCUMENTS

| 4,771,975 A | * | 9/1988 | Johnson | ................. | B60N 2/163 |
| | | | | | 248/430 |
| 6,068,664 A | * | 5/2000 | Meyer | ................. | B60R 22/1952 |
| | | | | | 297/480 |
| 2002/0024242 A1 | | 2/2002 | Becker | | |

(Continued)

FOREIGN PATENT DOCUMENTS

| DE | 100 41 827 A1 | 3/2002 |
| DE | 202 16 345 U1 | 3/2004 |

(Continued)

*Primary Examiner* — David E Allred
(74) *Attorney, Agent, or Firm* — The Sladkus Law Group

(57) ABSTRACT

The invention relates to a vehicle seat crash securing device (1) used for a vehicle seat of a motorized vehicle. The vehicle seat crash securing device (1) comprises a locking device for locking a height of a seat cushion frame. An actuator (3) is actuated in the case of a crash for tightening a belt rope (5). A blocking element in a blocking position holds a locking element of the locking device in an unlocked position. In a releasing position, the blocking element releases the locking element. The locking element is biased by a spring element into the locked position. The blocking element can be moved by a friction force generated by the actuator (3) from the blocking position into the releasing position. Preferably, the friction force is generated by a follower (8) (e.g. a friction wheel (9)), the follower (8) being pressed against the belt rope (5). The movement of the follower (8) is coupled to the movement of the blocking element.

11 Claims, 9 Drawing Sheets

(56) References Cited

U.S. PATENT DOCUMENTS

| | | | | |
|---|---|---|---|---|
| 2006/0061176 A1* | 3/2006 | Sakai | .................... | B60R 22/26 |
| | | | | 297/344.15 |
| 2007/0007807 A1* | 1/2007 | Hahn | .................... | B60N 2/507 |
| | | | | 297/344.12 |
| 2016/0318473 A1* | 11/2016 | Leckliter | ................ | B60R 22/18 |
| 2017/0225644 A1* | 8/2017 | Jaradi | ................ | B60R 22/1951 |
| 2018/0141469 A1* | 5/2018 | Suzuki | ................ | B60N 2/1685 |
| 2022/0316240 A1* | 10/2022 | Enger | .................... | F16G 11/14 |

FOREIGN PATENT DOCUMENTS

| | | | | |
|---|---|---|---|---|
| DE | 203 06 680 U1 | 6/2004 | | |
| GB | 2238461 A | * | 6/1991 | ......... B60R 22/1951 |

\* cited by examiner

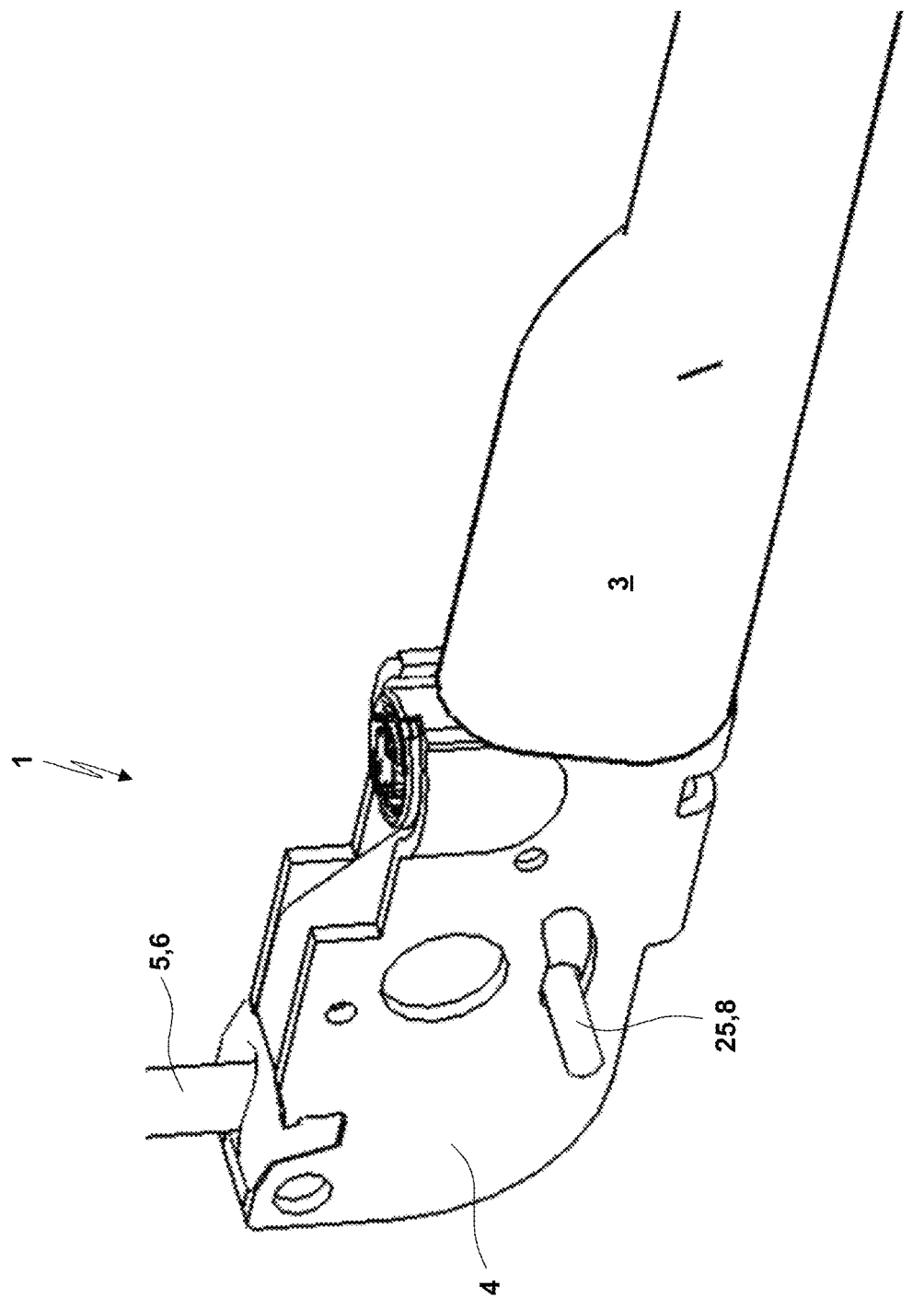

VEHICLE SEAT CRASH SECURING DEVICE AND VEHICLE SEAT

CROSS REFERENCE TO RELATED APPLICATIONS

This application claims priority to co-pending German Patent Application No. DE 10 2021 111 783.6 filed May 6, 2021.

FIELD OF THE INVENTION

The invention relates to a securing or safety device for a vehicle seat in the case of a crash (in the following "vehicle seat crash securing device". By means of the vehicle seat crash securing device it is possible to secure and lock a height of a seat cushion frame of the vehicle seat by means of a locking device in the case of a crash. Furthermore, by means of the vehicle seat crash securing device a belt rope which is coupled to a seat belt for a passenger sitting on the vehicle seat can be tightened.

BACKGROUND OF THE INVENTION

DE 100 41 827 A1, corresponding to US 2002/0024242 A1 belonging to the same patent family, discloses a vehicle seat wherein a seat rail of the vehicle seat can be slit in longitudinal direction of the vehicle relative to a longitudinal rail mounted to the vehicle floor. A seat frame part of a seat cushion frame is supported in a suitable way for allowing an adjustment of the height on the seat rail. This is accomplished by two coupling cranks linked remote from each other in the respective end regions in upper pivot bearings to the seat frame part. The other end regions of the two coupling cranks are linked in lower pivot bearings to the seat rail. The vertical distance of the seat frame part from the seat rail can be adjusted by a pivoting of the coupling cranks. Dependent on the lengths of the coupling cranks and the relative orientation of the coupling cranks the adjustment of the height of the seat frame part might also cause a change of the inclination angle of the seat frame part relative to the seat rail. According to DE 100 41 827 A1, an adjustment of a height is provided by use of an electric motor which biases a toothing via a transmission connection. The electric motor is mounted to the seat frame part. The toothing is supported by the rear coupling crank and extends in circumferential direction about the pivot axis of the upper pivot bearing wherein the rear coupling crank is supported on the seat frame part. A four bar linkage formed in this way with a seat rail, a seat frame part and two coupling cranks is arranged on both sides of the vehicle seat. The coupling cranks on the two sides are coupled by coupling elements (here a front pivot support and a rear transverse tube) with a fixation against a relative rotation. The seat frame parts are components of the seat cushion frame. The electric motor and the associated transmission are arranged on the side of the vehicle seat opposite to the side where the seat belt buckle is arranged. On the side of the vehicle seat where the seat belt buckle is arranged, a belt tensioning device is located. By means of the belt tensioning device it is possible to induce a movement of the seat belt buckle for tightening the seat belt in the case of a crash. Furthermore, on the side of the vehicle seat where the seat belt buckle is arranged a locking device is located by which it is possible to lock a height of the associated seat frame part and so of the seat cushion frame in the case of a crash. Here, in the case of a crash the seat belt tensioning device as well as the locking device are commonly actuated by one single actuator. The actuator comprises a drive cylinder which when triggered electrically applies a pulling force on a belt rope connected at the end to the seat belt buckle. When actuating the actuator the seat belt is moved for tightening the seat belt of the seat belt buckle and for actuating the locking device.

For one embodiment of DE 100 41 827 A1, a locking toothing is provided at the rear coupling crank. The locking toothing extends along a circumferential segment and concentrically to the pivot axis of the upper pivot bearing wherein the rear coupling rod is supported relative to the seat frame part. Here, the locking toothing is formed by a limiting surface of a curved elongated hole of the rear coupling crank. A locking element embodied as a locking lever is supported for being pivoted on the seat frame part by means of a pivot bolt. In an unlocked pivot position, the locking lever does not engage the locking toothing so that it is possible to pivot the rear coupling crank and so to adjust the height of the seat frame part and the seat cushion frame. In the unlocked pivot position, the locking lever can be secured by a locking pin or the pivot bolt is tightened to an extent that the locking lever is clamped in the pivot bearing and secured by friction in the unlocked pivot position. The actuation of the actuator leads to the drawing of the belt rope. At the same time, the belt rope applies a locking moment on the locking lever, the locking moment having an absolute value being sufficient for releasing the clamping of the locking lever in the pivot bearing or for shearing-off the locking pin which secures the unlocked pivot position. The locking moment then pivots the locking lever towards the locking toothing and towards an engagement with the same for providing a locking of the height of the seat frame part.

For another embodiment of DE 100 41 827 A1, the locking lever comprises a follower which generates the locking moment. In the normal operation, the follower displaces a section of the belt rope at a location between the pivot bearing of the locking lever (along which the belt rope is passed) and the seat belt buckle. Accordingly, the belt rope comprises a bend or kink in the contact region with the follower. The actuation of the actuator in the case of a crash leads to the generation of the pulling force in the belt rope by the actuator which tends to a straightening of this section of the belt rope which causes a movement of the follower and a movement of the locking lever towards the locking toothing. Accordingly, for this embodiment the locking moment is created by the force applied by the belt rope on the follower, the force tending to a straightening of the belt rope in the contact section.

For another embodiment, the locking lever comprises a belt rope sleeve which extends coaxially to the pivot axis of the locking lever. The belt rope is wrapped with a wrap angle of approximately 70° along the belt rope sleeve. If the belt rope is drawn inside by the actuator, the rope friction between the belt rope and the belt rope sleeve takes the locking lever along so that the locking lever is then moved towards the locking toothing. Accordingly, for this embodiment the locking moment is generated by the belt rope friction.

It can be seen from the different embodiments of DE 100 41 827 A1 that the locking toothing is either connected with a fixation against rotation to the rear coupling crank (in particular integrated into the coupling crank) or formed by a toothed curved bracket which is supported for being pivoted on the seat rail. Furthermore, the different embodiments of DE 100 41 827 A1 show that it is possible to embody the locking toothing as an outer toothing or an inner toothing, whereas in this case the locking lever with its counter-locking toothing engages in radial inner direction with the outer toothing or in radial outer direction with the inner toothing. According to DE 100 41 827 A1, it is also possible that instead of a counter-locking toothing the locking lever might also comprise a locking pin which engages with the locking toothing.

Also DE 203 06 680 U1 discloses the use of an actuator both for tightening the seat belt as well as for locking the height of the seat cushion frame. Here, the actuator is embodied as a pyrotechnic actuator. The locking toothing is formed by a toothed curved bracket supported for being pivoted on the seat rail. In its locked position, the toothed curved bracket engages with a counter-locking toothing of a locking element. Here, the locking element is embodied as a locking lever supported for being pivoted on the seat frame part. A first lever part of the locking lever facing towards the toothed curved bracket comprises the counter-locking toothing. The second lever part of the locking lever is biased by a spring towards an engagement of the counter-locking toothing with the locking toothing of the toothed curved bracket. However, a blocking element embodied as a shearing-off pin holds the locking lever (despite of its bias by the spring) in an unlocked state. An actuation of the actuator leads (additional to the seat belt tightening) to a movement of the shearing-off pin such that the shearing-off pin releases the locking lever so that the spring is able to pivot the locking lever such that the counter-locking toothing of the locking lever engages with the locking toothing of the toothed curved bracket. When actuating the actuator, the shearing-off pin is moved by a translational movement in a direction vertical to the pivot plane of the locking lever out of contact with the locking lever. In the case that the release of the pivoting of the locking lever by a movement of the shearing-off pin fails, the unlocking can be induced in a redundant fashion by inducing a shearing-off of the shearing-off pin by an actuation of the actuator so that it is also possible that the spring moves the locking lever to a locking engagement with the toothed curved bracket. A part of the pivot angle of the locking lever wherein the shearing-off pin shears off is coupled to the movement of the seat belt tensioner whereas the remaining part of the pivot angle of the pivoting movement of the locking lever is induced by the spring after the shearing-off pin has been shorn off.

DE 202 16 345 U1 discloses the use of a locking element embodied as a locking lever. Also here, the locking lever is biased by a spring towards the locked pivot position. However, in the normal operation the locking lever is held by a blocking element in the unlocked position. The blocking element is embodied as a follower. When activating the pyrotechnic actuator due to the movement of the seat belt buckle the follower is taken along by the movement of a mounting sleeve surrounding the seat belt with a positive form lock. In this way, the locking lever is released and the spring is able to move the locking lever into engagement with the locking toothing.

SUMMARY OF THE INVENTION

An inventive vehicle seat crash securing device comprises a locking device by which it is possible to lock a height of a seat cushion frame of the vehicle seat in the case of a crash. Here, the locking device might lock any part of the structure for adjusting the height and in particular any part of the four bar linkage against each other or against a component being fixed to the vehicle (cp. also the prior art mentioned above wherein the coupling crank or a toothed curved bracket linked to the seat rail is locked). Here, a locking device is understood to cover any device which by a positive form lock avoids a relative movement of components required for a change of the height against the forces which are usually effective in the case of a crash. A locking device e.g. covers the engagement of two corresponding toothings, a single tooth, pin or other locking element with a toothing, the accommodation by a form lock of a locking bolt in a locking recess or also a latching (in order to mention some examples which are not intended to limit the invention).

The invention in particular improves a vehicle seat crash securing device with respect to
- an actuation kinematic on the one hand side for the locking device and on the other hand side for the seat belt tensioning and/or
- the force level and/or the force curve which have/has to be provided by the actuator and/or
- the options for the design of the actuation characteristic for a locking element of the locking device and/or
- the costs and/or
- the constructional space requirements and/or
- the assembly and/or
- an interaction between the locking device and the seat belt tensioning.

Furthermore, the invention in particular proposes a vehicle seat with a correspondingly improved vehicle seat crash securing device.

The inventive vehicle seat crash securing device comprises an actuator. The actuator is preferably embodied as a pyrotechnical actuator. However, it is generally also possible that other types of actuators can be used within the frame of the invention. The actuator is actuated automatically in the case of a crash. This automatic actuation might be provided according to the solutions known from the prior art. When actuated the actuator tightens the seat belt rope with a pulling force. This tightening by the pulling forces causes that a seat belt buckle held at the end of the seat belt rope is pulled downwards and the seat belt inserted into the seat belt buckle is tightened so that a person sitting on the vehicle seat is pulled towards the vehicle seat and/or a slack or loose part of the seat belt is tightened.

The locking device comprises a locking element which together with a suitable counter-locking element provides the locking effect.

Furthermore, the vehicle seat crash securing device comprises a blocking element. The blocking element in a blocking position holds the locking element of the locking device in an unlocked position. The blocking element can also be transferred into a releasing position. In the releasing position, the blocking element releases the locking element.

The vehicle seat crash securing device also comprises a spring element. This spring element might have any design and might e.g. be a spring made of metal, an elastomeric spring, a spring package with a plurality of springs arranged parallel to each other or one behind another, a spiral spring, a compression spring, a rotational spring or leg spring (in order to mention only some examples which are not intended to limit the invention). The spring element biases the locking element towards the locked position. If the blocking element is in the blocking position, the spring element biases the locking element against the blocking element. Instead, if the blocking element is in the releasing position, the spring element is able to move the locking element from the unlocked position into the locked position.

The blocking element is moved by a friction force generated by the actuator from the blocking position into the releasing position.

The above proposed measures in particular lead to the following advantages (which might apply alternatively or cumulatively; the invention not being limited to these advantages):

a) If according to DE 100 41 827 A1 a locking element is used which has a follower which in the unlocked position deflects the belt rope in the section between the pivot bearing of the locking element and the seat belt buckle from the straight form into a bend form, a disadvantage is that pulling forces applied by the passenger onto the seat belt or the seat belt buckle (e.g. due to movements of the passenger relative to the vehicle seat) might also lead to a pivoting of the locking element and a locking of the locking device without an actuation of the actuator which is undesired.

b) Additionally, according to DE 100 41 827 A1 in the case of small bending angles of the belt rope in the contact section with the follower the force conditions in the belt rope are adverse. Accordingly, here a generation of small forces that have to be applied onto the follower for actuating the locking device requires that the actuator has to create high pulling forces.

c) Finally, according to DE 100 41 827 A1 the forces which bias the locking element towards the locking toothing depend (corresponding to a given [non-linear] dependency defined by the geometric properties) from the pulling force generated by the actuator and from the tensioning of the seat belt which might be undesired.

d) For another embodiment of DE 100 41 827 A1 wherein the actuation of the locking element is triggered by the belt rope friction there is also a fixed dependency between the pulling force generated by the actuator in the belt rope, the seat belt tensioning and the locking moment which moves the locking lever towards the locking toothing and presses the locking lever against the locking toothing. If in the case of a crash there is only a short loosening of the seat belt, the belt rope friction breaks down. Accordingly, it is possible that the locking lever moves away from the locking toothing which might result in an undesired change of the height of the seat cushion frame of the vehicle seat.

e) Instead, DE 202 16 345 U1 uses a blocking element which is transferred from the blocking position into the releasing position by a control by movement by the actuation of the mounting sleeve surrounding the belt rope. This control by motion requires a manufacturing of the related constructional elements with a high precision and a precise assembly because any inaccuracies of the manufacturing or assembly might have an effect on the actuation of the blocking element. Furthermore, this solution causes high demands on the mechanical strength of the mounting sleeve. Any failure or changes of the elastic behavior of the mounting sleeve during the belt tensioning might lead to a changed behavior of the blocking element and so of the locking device.

Generally, the friction forces used for the movement of the blocking element from the blocking position into the releasing position and caused by the actuator might be induced at any position between the actuator and the seat belt buckle. Preferably, the friction force is generated at a follower. The follower is pressed with a normal force against the belt rope. Here, the absolute value of the normal force is preferably chosen to be so high that the normal force induced by a movement of the belt rope leads to a friction force having an absolute value of an amount sufficient for moving the blocking element from the blocking position into the releasing position (in some cases also against friction biasing the blocking element and any other resistances biasing the blocking element or even against the bias by spring elements). It is generally also possible that when arriving in the releasing position the belt rope and the actuator have reached their end positions. If this is not the case, also a sliding movement or any other relative movement between the follower and the belt rope might initiate when arriving in the releasing position.

For solutions known from the prior art wherein the belt rope is wrapped around a follower, the normal force biasing the follower depends on the pulling force in the belt rope. Instead, one embodiment of the invention preferably proposes that the normal force is (generally) independent on the pulling force in the belt rope. It is also possible that the normal force is completely independent on the pulling force in the belt rope. A "normal force being generally independent on the pulling force in the belt rope" also covers a normal force which only changes due to a change of the cross-section of the belt rope caused by the effective pulling force.

For the design of the follower, there are a lot of different options. It is e.g. possible that the follower can be moved along any straight or curved degree of freedom and executes a follower movement which then directly or indirectly causes the movement of the blocking element. It is also possible that the follower is a pivoting lever. For one proposal of the invention, the follower is a friction wheel which rolls along the belt rope. Here, the friction wheel might be biased by a spring element with its outer circumference against the belt rope for creating the normal force. For this purpose, the friction wheel might have a rotational axis which is movable towards the belt rope. It is also possible that the friction wheel has a fixed rotational axis but the rotational axis is supported by an elastic sleeve or comprises an elastic circumferential surface so that the friction wheel is pressed with an elastic deformation due to the effective normal force against the belt rope.

For one inventive vehicle seat crash securing device the friction force is only generated in a subsection of the stroke of the actuator. Generally, it is already possible that the friction force level required for inducing the unlocking is reduced when the friction force of the follower does not directly bias the locking element for generating the locking moment but biases the blocking element. Accordingly, it is also possible to reduce the force level which has to be provided by the actuator. In the case that the friction force is only effective over a subsection of the stroke of the actuator, the biases of the actuator are reduced in the other subsection of the stroke and the interaction of the friction force with the intended seat belt tensioning is only given in the first subsection of the stroke of the actuator. Instead, in the other subsection of the stroke there is no friction force so that in this other subsection of the stroke the actuator is able to provide the seat belt tensioning function in a reliable way.

For one embodiment, the friction wheel comprises a first radius in a first circumferential segment part and a second radius in a second circumferential segment part. In the region of the first circumferential segment part, the friction wheel is pressed with a first normal force against the belt rope. The second radius is smaller than the first radius. In the region of the second circumferential segment part, the friction wheel is not pressed with a normal force against the belt rope. Accordingly, in the region of the second circumferential segment part the aforementioned uncoupling is provided. The two different circumferential segment parts might in some cases also be used in an advantageous way for the assembly and/or disassembly: if the second circumferential segment part is effective, it is very simple to provide the assembly of the belt rope because there are no disturbing interactions with the friction wheel and it is possible to provide any displacements of the belt rope for the assembly and/or disassembly. When the assembly of the belt rope (and possible further components) has been completed, the friction wheel can be rotated so that the first circumferential segment part becomes effective and accordingly the coupling of the belt rope to the movement of the blocking element is provided by the frictional coupling.

Generally, the follower or the friction wheel as well as a guide for the belt rope might be arranged in any way.
  a) For one inventive vehicle seat crash securing device, the belt rope is clamped between the follower or the friction wheel, on the one hand, and a rolling guide or sliding guide, on the other hand. The clamping force defines the normal force which then creates the friction force for actuating the blocking element.
  b) For a different embodiment, the follower is clamped between a rolling guide or sliding guide, on the one hand, and the belt rope, on the other hand.

Advantageous developments of the invention result from the claims, the description and the drawings.

The advantages of features and of combinations of a plurality of features mentioned at the beginning of the description only serve as examples and may be used alternatively or cumulatively without the necessity of embodiments according to the invention having to obtain these advantages.

The following applies with respect to the disclosure—not the scope of protection—of the original application and the patent: Further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims which, however, does not apply to the independent claims of the granted patent.

The number of the features mentioned in the claims and in the description is to be understood to cover this exact number and a greater number than the mentioned number without having to explicitly use the adverb "at least". For example, if an element is mentioned, this is to be understood such that there is exactly one element or there are two elements or more elements. Additional features may be added to these features, or these features may be the only features of the respective product.

The reference signs contained in the claims are not limiting the extent of the matter protected by the claims. Their sole function is to make the claims easier to understand.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

FIG. 9 shows the vehicle seat crash securing device of FIGS. 7 and 8 in a three-dimensional view with an assembled housing.

DETAILED DESCRIPTION

Figure 1:
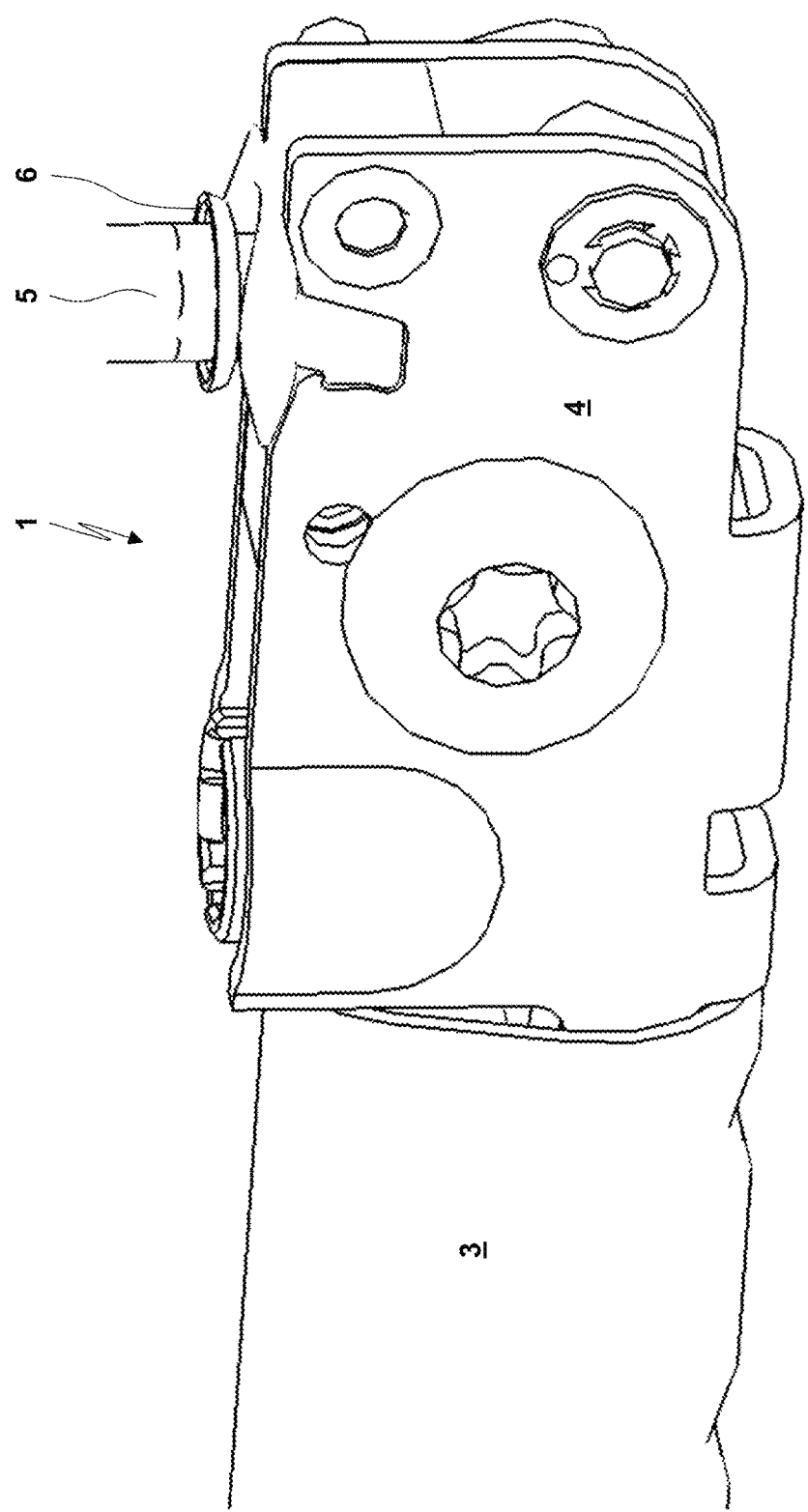
FIG. 1 shows a vehicle seat crash securing device in a three-dimensional view with a viewing direction from the outside on the vehicle seat.
Figure 2:
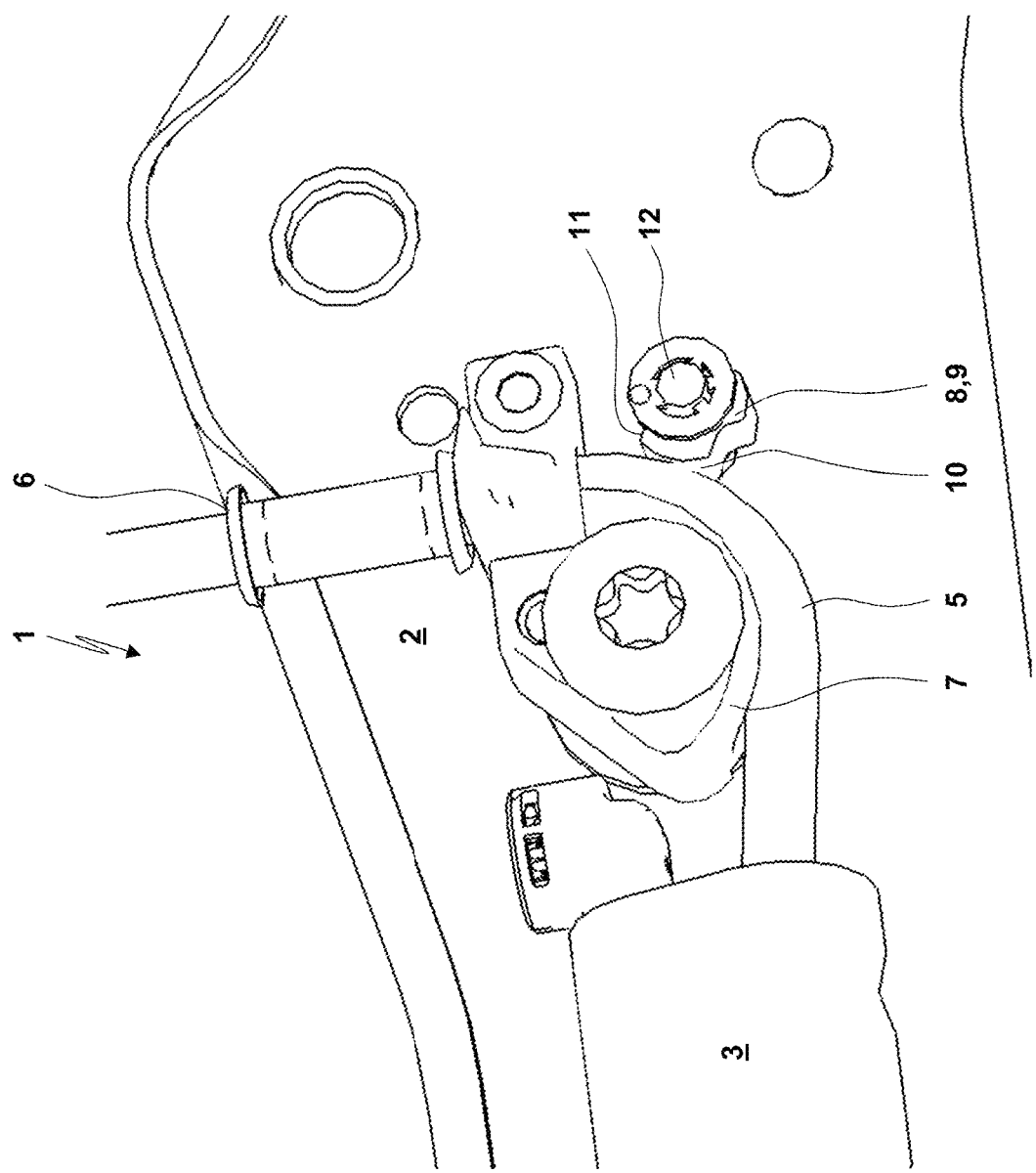
FIGS. 2 and 3 show different three-dimensional views of the vehicle seat crash securing device of FIG. 1 with a disassembled housing.
Figure 3:
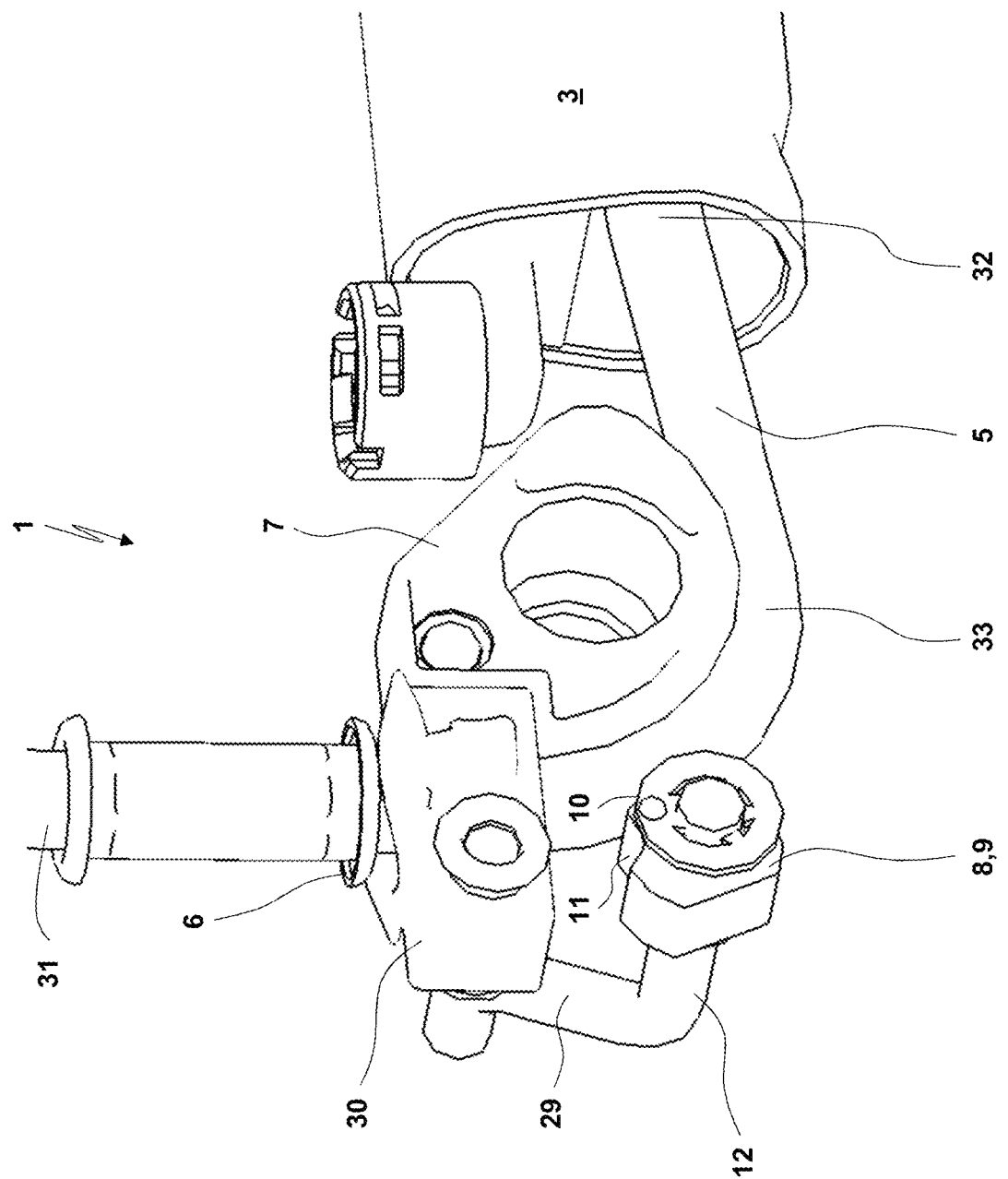

Referring now in greater detail to the drawings, FIGS. 1 to 3 show a vehicle seat crash securing device 1 with a viewing direction from the outside on a seat frame part 2. The vehicle seat crash securing device 1 comprises an actuator 3 which is preferably embodied as a pyrotechnical actuator. A housing 4 is supported on the housing of the actuator 3. A belt rope 5 extends upwards out of the housing 4. The belt rope 5 can be accommodated in a mounting or guiding sleeve 6. When actuating the actuator 3, the belt rope 5 is drawn by the actuator which in generally known fashion leads to a tightening or tensioning of the seat belt.

FIGS. 2 and 3 show the vehicle seat crash securing device 1, the housing 4 here being disassembled. It can be seen that in the vehicle seat crash securing device 1 the belt rope 5 is guided by a sliding guide 7 (preferably approximately along a bow having the shape of a quadrant). When actuating the actuator 3, the belt rope 5 slides along the sliding guide 7 in clockwise direction in FIG. 2. In a direction transverse to the longitudinal extension of the belt rope 5 the sliding guide 7 might have a sliding contour which is e.g. concave and which guides the belt rope 5 transverse to its movement during the actuation of the actuator 3.

With the movement of the belt rope 5 triggered by the actuation of the actuator 3 also a follower 8 is moved. For the embodiment shown in FIGS. 1 to 6, the follower 8 is embodied as a friction wheel 9. The friction wheel 9 is pressed elastically with a normal force against the belt rope 5 on the side facing away from the sliding guide 7. Accordingly, the belt rope 5 is elastically clamped between the sliding guide 7 and the friction wheel 9. Here, the clamping force and the normal force pressing the friction wheel 9 against the belt rope 5 are independent on the pulling force in the belt rope 5. If the belt rope 5 is drawn by the actuation of the actuator 3, due to the friction between the friction wheel 9 and the belt rope 5 caused by the normal force the friction wheel 9 is taken along. Accordingly, the friction wheel 9 rotates in counterclockwise direction in FIG. 2.

As an optional feature, the friction wheel 9 might comprise a first circumferential segment part 10. In the first circumferential segment part 10, the friction wheel 9 comprises a first radius. The first radius is dimensioned such that the belt rope 5 is clamped between the friction wheel 9 and the sliding guide 7 and due to the caused friction the friction wheel 9 is taken along with the belt rope 5. In another circumferential section, the friction wheel 9 comprises a second circumferential segment part 11. In the second circumferential segment part 11, the friction wheel 9 has a second radius, the second radius being smaller than the first radius. Here, the second radius is dimensioned such that in the region of the second circumferential segment part 11 there is no contact between the belt rope 5 and the friction wheel 9. The design of the friction wheel 9 with the two circumferential segment parts 10, 11 leads to the consequence that the friction wheel only takes the belt rope 5 along over a rotational angle wherein the circumferential segment part 10 is pressed against the belt rope 5. After this rotational angle the second circumferential segment part 11 becomes effective which leads to an uncoupling of the movement of the belt rope 5 from the rotation of the friction wheel 9. Accordingly, the stroke of the actuator 3 and the movement of the belt rope 5 for tightening or tensioning the seat belt is only coupled to the rotation of the friction wheel 9 in a subsection of the stroke. This subsection of the stroke is limited by the transition from the circumferential segment part 10 to the circumferential segment part 11. For the subsequent subsection of the stroke of the actuator 3 and the belt rope 5 there is only a tightening of the belt. The friction wheel 9 can be supported for being rotated on a seat frame part 2.

For the shown embodiment, the friction wheel 9 is supported for being rotated on a supporting arm 29. The supporting arm 29 is again supported for being pivoted on a supporting element 30. In the factory, it is possible to adjust the clamping force of the friction wheel 9 with the circumferential segment part 10 and the belt rope 5 by a pivoting of the supporting arm 29. The supporting element 30 can again be fixedly connected to the sliding guide 7 or can also be formed by the same. It is also possible that the supporting arm 29 is supported for being rotated on the supporting element 30 and biased by a rotational spring towards the belt rope 5. In this case the supporting arm 29 contacts a stop for allowing the uncoupling of the friction wheel 9 from the movement of the belt rope 5 in the circumferential segment part 11.

Figure 4:
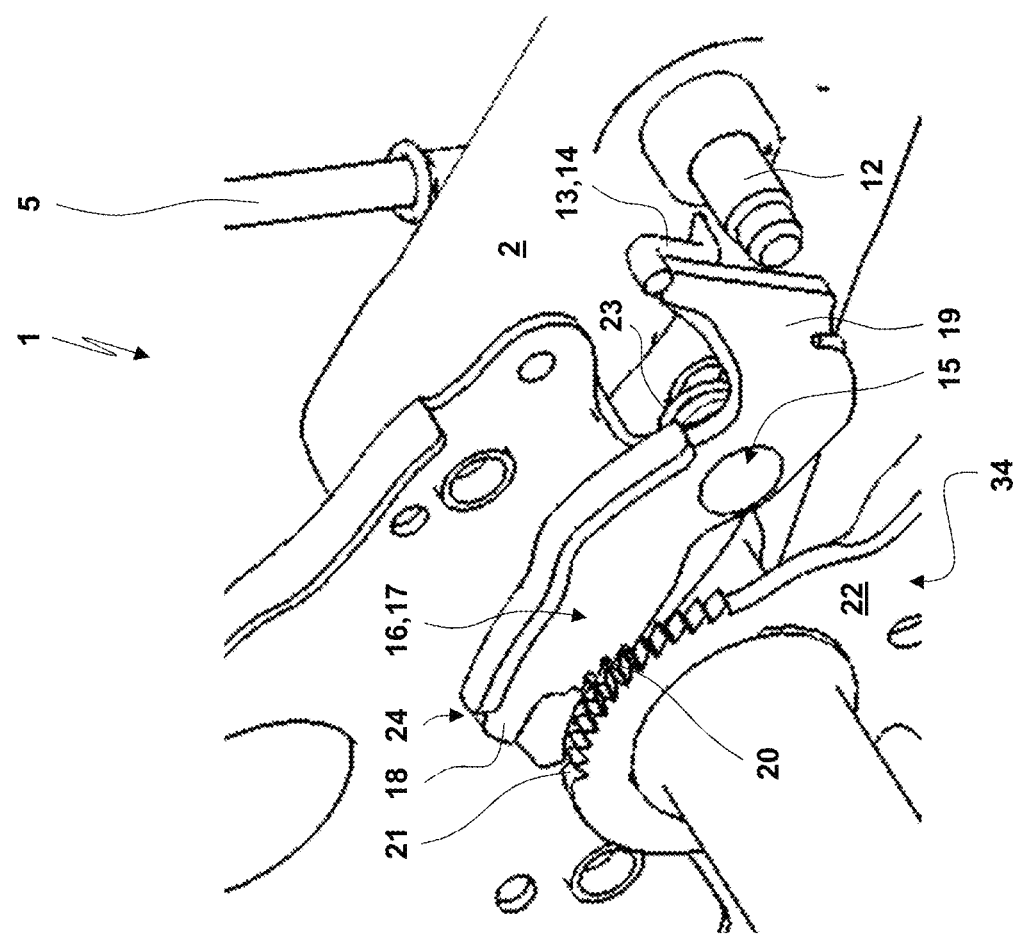
FIGS. 4 and 5 show different three-dimensional views of the vehicle seat crash securing device of FIGS. 1 to 3 with a viewing direction from the inside on the vehicle seat, wherein a blocking element of the vehicle seat crash securing device is in a blocking position and a locking device is in an unlocked position.
Figure 5:
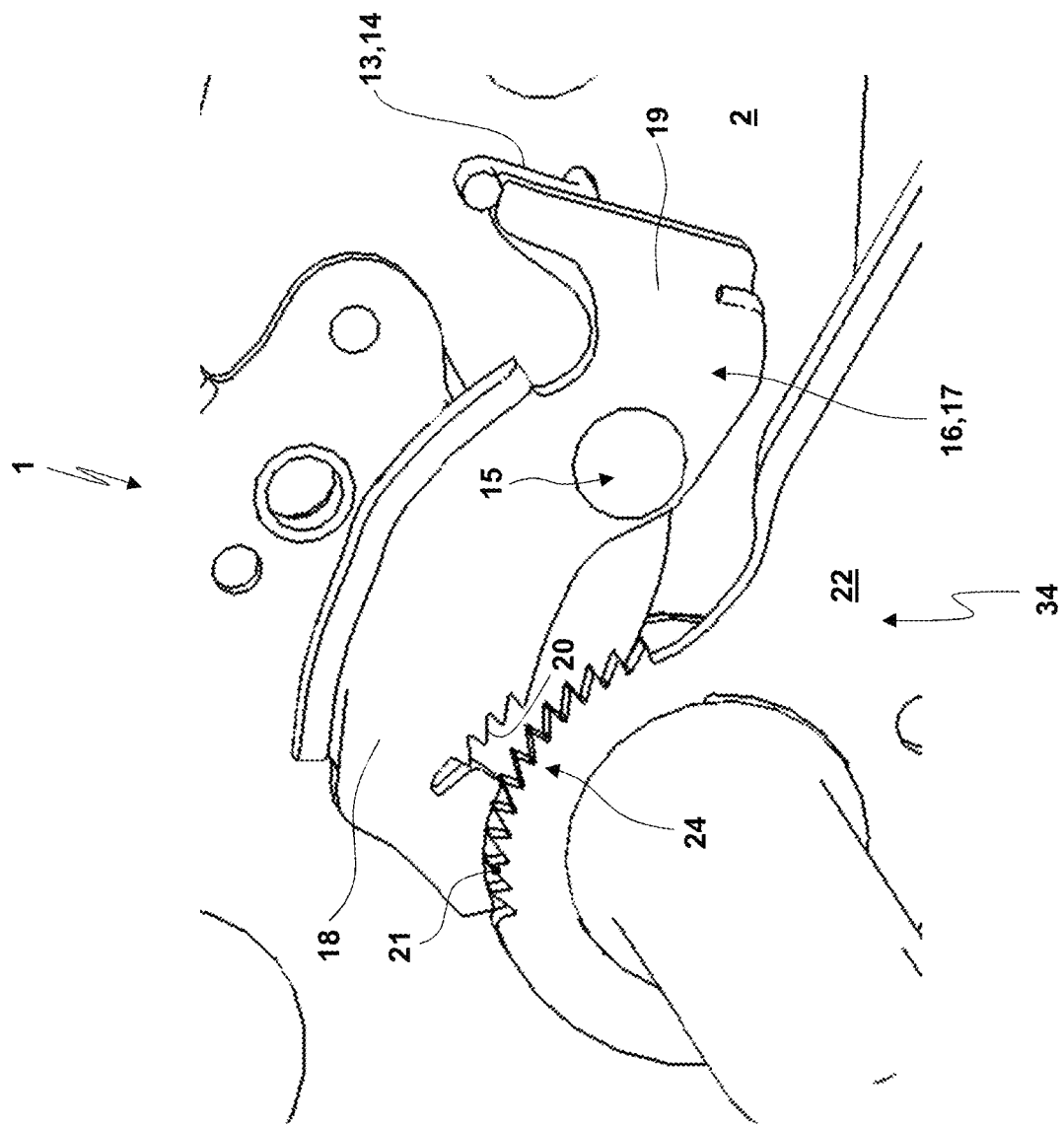
Figure 6:
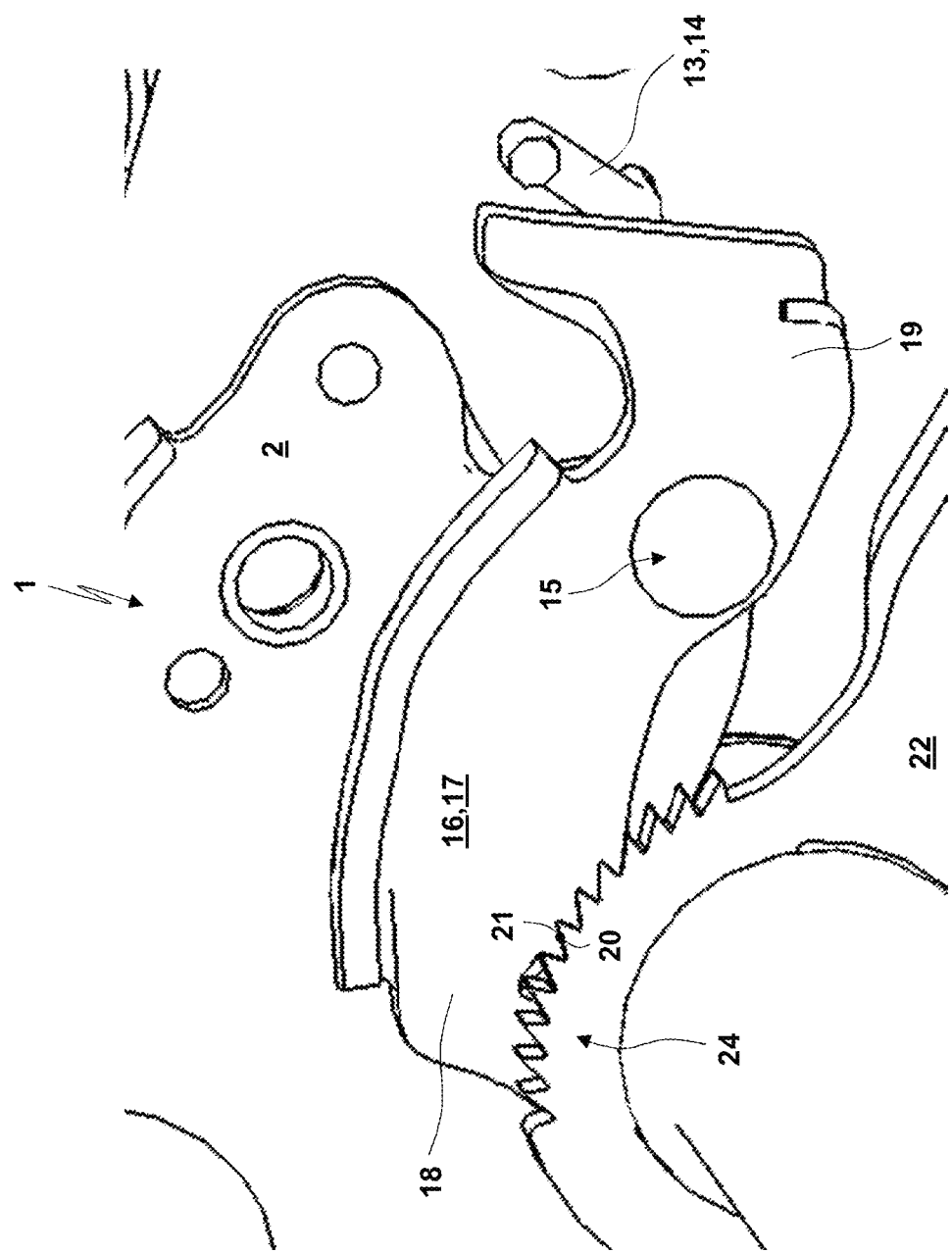
FIG. 6 shows the vehicle seat crash securing device of FIGS. 1 to 5, here the blocking element of the vehicle seat crash securing device being in the releasing position and the locking device being in a locked position.

FIGS. 4 to 6 show the vehicle seat crash securing device 1 with a viewing direction from the interior of the vehicle seat on the seat frame part 2. An unblocking shaft 12 which is connected with a fixation against rotation to the friction wheel 9 extends through the seat frame part 2. On the inner side of the seat frame part 2 a blocking element 13 is connected to the unblocking shaft 12 with a fixation against rotation. Here, the blocking element 13 is embodied as a blocking lever 14.

A locking element 16 (here embodied as a locking lever 17) is supported or guided by a pivot bearing 15 on the seat frame part 2. The pivot axis of the pivot bearing 15 has an orientation parallel to the rotational axis of the unblocking shaft 12. The locking lever 17 comprises two lever parts 18, 19. The pivot bearing 15 is arranged in the connecting region of the lever parts 18, 19. The lever part 18 comprises a locking toothing 20. The locking toothing 20 has a suitable shape for engaging a counter-locking toothing 21 formed by a rear coupling crank 22 or connected with a fixation against rotation to the same. The locking lever 17 is biased by a pre-tensioned spring element 23 in counterclockwise direction in FIGS. 4 to 6. Accordingly, the spring element 23 tends to bring the locking toothing 20 of the locking lever 17 into engagement with the counter-locking toothing 21 of the coupling crank 22.

However, in the beginning in the unlocked position of the locking lever 17 according to FIGS. 4 and 5 the locking toothing 20 of the locking lever 17 is held at a distance from the counter-locking toothing 21 of the coupling crank 22. For this purpose, the lever part 19 contacts the blocking element 13 (here the blocking lever 14) in a way such that the blocking lever 14 blocks the pivoting of the locking lever 17 by the bias by the spring element 23 in counterclockwise direction. The blocking lever 14 is in its blocking position.

If instead the actuator 3 is actuated, the belt rope 5 is drawn and due to the friction the belt rope 5 rotates the friction wheel 9. The blocking lever 14 is pivoted so that the blocking lever 14 releases the locking lever 17. In this releasing position of the blocking lever 14 the spring element 23 is able to pivot the locking lever 17 to an extent such that the locking toothing 20 engages the counter-locking toothing 21.

The locking lever 17, the spring element 23 and the locking toothing 20 are components of a locking device 24 by which it is possible to lock a height of the seat frame part 2.

Figure 7:
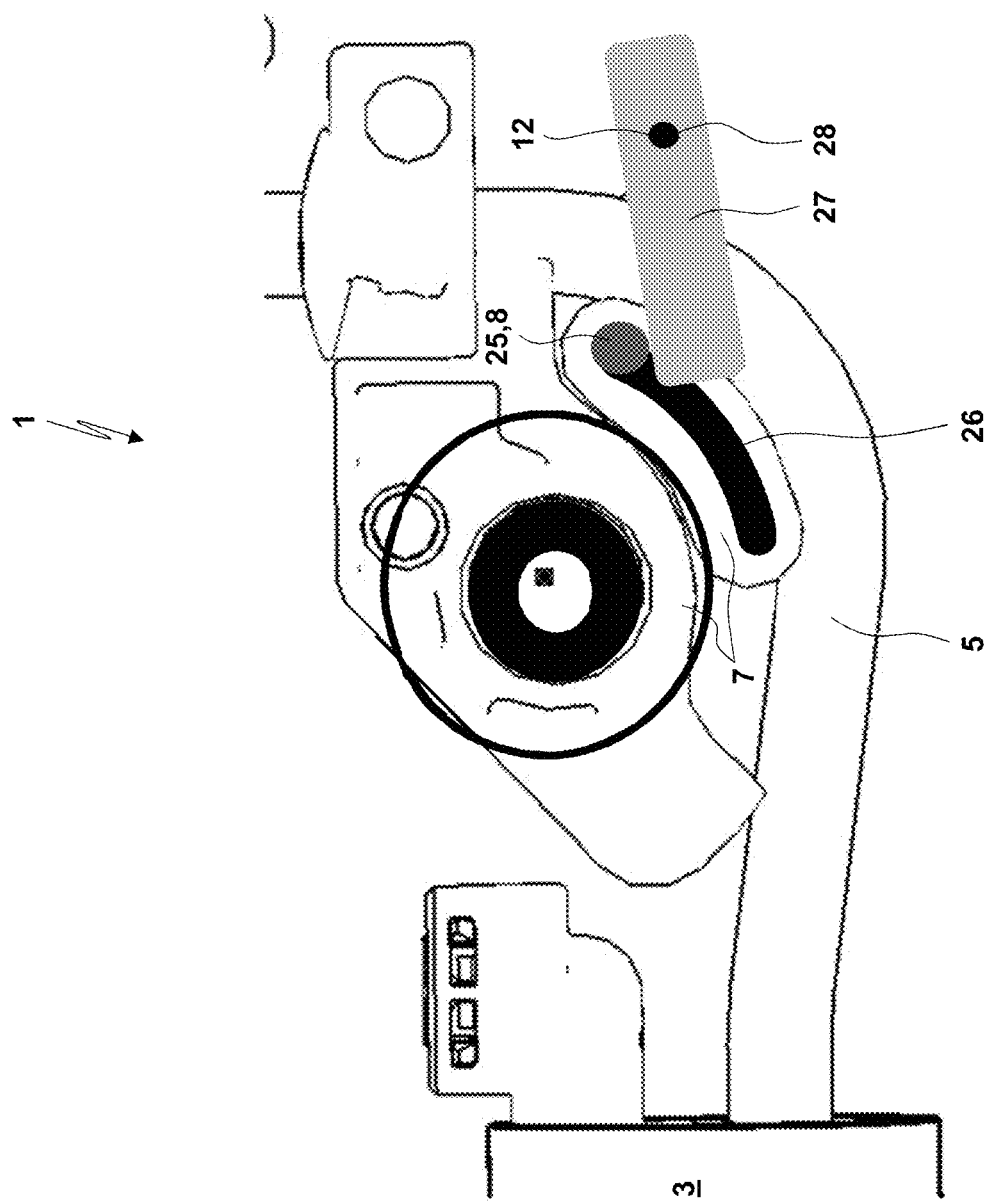
FIG. 7 schematically shows another embodiment of a vehicle seat crash securing device with a disassembled housing.
Figure 8:
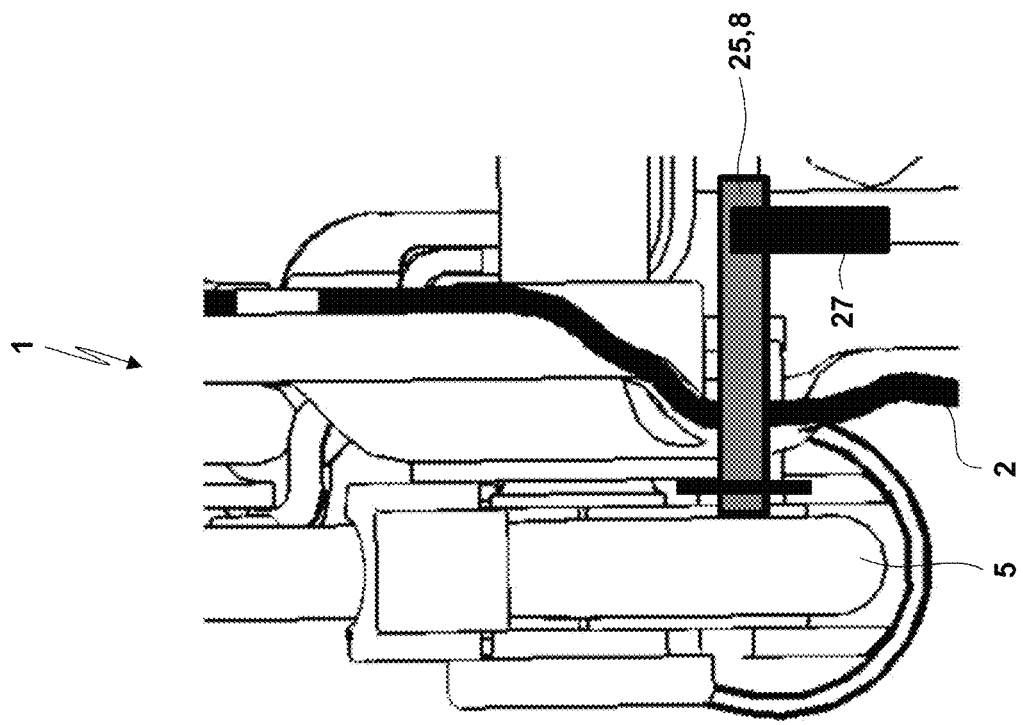
FIG. 8 shows the vehicle seat crash securing device of FIG. 7 in a sectional view.

FIGS. 7 to 9 show another embodiment of a vehicle seat crash securing device 1. For this embodiment, the follower 8 (here embodied as a follower bolt 25) is clamped between the belt rope 5 and a sliding guide 7 for the belt rope 5. Accordingly, in this case the contact force of the follower 8 and the belt rope depends on the pulling force in the belt rope 5. The follower bolt 25 is guided in a slotted link 26. For the shown embodiment, the slotted link 26 has the shape of a semicircular bow (without this necessarily being the case). Differing from the embodiment shown in FIGS. 1 to 6, for this embodiment the follower 8 is not rigidly coupled to the blocking element 13. Instead, the follower 8 cooperates with a blocking lever 27 which is supported for being pivoted by a pivot bearing 28 on the seat frame part 2. FIG. 7 shows the blocking lever 27 in a blocking position. In this blocking position, the blocking lever 27 can be biased by a spring towards the follower bolt 25. In the blocking position, the blocking lever 27 holds the locking device 24 in the unlocked position (generally corresponding to the embodiment shown in FIGS. 1 to 6). When actuating the actuator 3 and drawing the belt rope 5, the follower bolt 25 is taken along by the belt rope 5 which causes a pivoting movement of the blocking lever 27 in counterclockwise direction in FIG. 7. This pivoting of the blocking lever 27 transfers the blocking lever 27 into its releasing position. In the releasing position the movement of the locking element 16 of the locking device 24 is released so that the locking device 24 is able to move into the locked position.

The toothings of the locking toothing 20 and the counter-locking toothing 21 are in particular self-impeding or self-locking. This leads to the result that when the locking toothing 20 engages the counter-locking toothing 21 forces biasing the toothings 20, 21 are not able to cause a separation of the locking toothing 20 from the counter-locking toothing 21. Accordingly, the locked position is not or not only secured by the effect of the spring element 23 but (also) by the self-impeding or self-locking effect of the toothings. The strength of the self-impeding effect can here be defined by the construction by the choice of the tooth angle of the negative teeth of the locking toothing 20 and the counter-locking toothing 21.

It is possible that in the beginning the follower bolt 25 is fixed in the slotted link 26 by a fixing element. However, the fixing element might comprise a predetermined breaking point so that the actuation of the actuator 3 and the transmission of sufficient follower forces lead to a breaking of the fixing element so that the follower bolt 25 is able to move along the slotted link 26.

For the embodiments, the locking device 24 is preferably actuated by the spring element. The pre-tensioned spring element 23 provides the energy and the required stiffness for providing a reliable unlocking of the locking device 24 when the blocking element 23 has moved into the releasing position. Instead, only the forces required for transferring the blocking element 13 from the blocking position into its releasing position have to be provided by the actuator 3 and the friction contact of the follower 8 with the belt rope 5 so that in some cases a much smaller force level is required. Here, the force required might only be a small part of the whole force provided by the actuator 3 so that a major part of the force can be used for the tightening of the seat belt. Nevertheless, at the same time the locking of the locking device 24 can be provided. Furthermore, the actuator 3 has to provide this small force only during a subsection of the overall stroke available for the belt tightening.

With respect to further information and in particular the integration of the vehicle seat crash securing device 1 and optional variants (e.g. the arrangement of the locking toothing 20 at a toothed curved bracket instead of the coupling crank 22) reference is made to the prior art mentioned in the beginning.

The seat frame part 2 is supported by a support structure 34 in an adjustable height. The support structure 34 might e.g. comprise the coupling cranks 22 pivoted for adjusting the height of the seat frame part 2.

The belt rope 5 comprises a first end region 31 linked to the actuator 3, a second end region 32 linked to a seat belt buckle and an intermediate region 33 which contacts the follower 8.

Many variations and modifications may be made to the preferred embodiments of the invention without departing substantially from the spirit and principles of the invention. All such modifications and variations are intended to be included herein within the scope of the present invention, as defined by the following claims.

We claim:

1. A vehicle seat crash securing device comprising
   a) a belt rope which can be connected to a seat belt buckle,
   b) a locking device for locking a height of a seat cushion frame of a vehicle seat, the locking device comprising a locking element which can be moved between a locked position and an unlocked position
   c) an actuator which
      ca) is actuated in the case of a crash,
      cb) tightens the belt rope with a pulling force,
   d) a blocking element which can be moved between a blocking position and a releasing position wherein the blocking element
      da) in the blocking position holds the locking element of the locking device in the unlocked position and
      db) in the releasing position releases the locking element and
   e) a spring element which biases the locking element and in the releasing position of the blocking element moves the locking element from the unlocked position into the locked position,
   f) wherein the blocking element is configured to be moved by a friction force imparted by the belt rope on the blocking element to move the blocking element from the blocking position into the releasing position, the friction force being induced by the actuator.

2. The vehicle seat crash securing device of claim 1 wherein the friction force is generated at a follower which is pressed with a normal force against the belt rope, a movement of the follower causing the movement of the blocking element.

3. The vehicle seat crash securing device of claim 2 wherein the normal force is not dependent on the pulling force in the belt rope.

4. The vehicle seat crash securing device of claim 2 wherein the follower is a friction wheel.

5. The vehicle seat crash securing device of claim 1 wherein the friction force is only generated in a subsection of a stroke of the actuator.

6. The vehicle seat crash securing device of claim 4 wherein the friction force is only generated in a subsection of a stroke of the actuator.

7. The vehicle seat crash securing device of claim 6 wherein the friction wheel comprises
   a) a first circumferential segment part having a first radius, in the region of the first circumferential segment part the friction wheel being pressed with a normal force against the belt rope and
   b) a second circumferential segment part having a second radius being smaller than the first radius wherein the friction wheel is not pressed with a normal force against the belt rope or does not contact the belt rope in the region of the second circumferential segment part.

8. The vehicle seat crash securing device of claim 2 wherein the belt rope is clamped between
   a) the follower and
   b) a rolling guide or sliding guide.

9. The vehicle seat crash securing device of claim 2 wherein the follower is clamped between
   a) a rolling guide or sliding guide and
   b) the belt rope.

10. A vehicle seat crash securing device comprising
    a) a seat frame part,
    b) an actuator fixed to the seat frame part,
    c) a support structure supporting the seat frame part and configured for allowing an adjustment of a height of the seat frame part,
    d) a locking device configured for locking a height of the seat frame part, the locking device comprising a locking element and a counter-locking element, the locking element being movable between
       a locked position wherein the support structure is locked by an engagement of the locking element and the counter-locking element so that the height of the seat frame part is fixed and secured and
       an unlocked position wherein the locking element and the counter-locking element do not engage each other so that the height of the seat frame part can be adjusted,
    e) a belt rope which is connected in a first end region to the actuator and in a second end region to a seat belt buckle, the belt rope comprising an intermediate region which is located between the first end region and the second end region wherein the intermediate region is pressed with a contact force against a follower which allows the generation of a friction force between the belt rope and the follower,
f) a blocking element supported by the seat frame part, the blocking element being movable between a blocking position and a releasing position wherein the blocking element
   fa) in the blocking position blocks and holds the locking element of the locking device in the unlocked position and
   fb) in the releasing position releases the locking element so that it can be moved from the unlocked position into the locked position,
g) a spring element which biases the locking element towards the locked position and in the releasing position of the blocking element moves the locking element from the unlocked position into the locked position,
h) wherein the actuator
   ha) is actuated in the case of a crash
   hb) tightens the belt rope by the application of a pulling force on the first end region and
i) the blocking element is configured to be moved by the friction force imparted by the belt rope on the blocking element to move the blocking element from the blocking position into the releasing position, the friction force being induced by the actuator.

11. A vehicle seat comprising a vehicle seat crash securing device comprising
   a) a belt rope which can be connected to a seat belt buckle,
   b) a locking device for locking a height of a seat cushion frame of a vehicle seat, the locking device comprising a locking element which can be moved between a locked position and an unlocked position
   c) an actuator which
      ca) is actuated in the case of a crash,
      cb) tightens the belt rope with a pulling force,
   d) a blocking element which can be moved between a blocking position and a releasing position wherein the blocking element
      da) in the blocking position holds the locking element of the locking device in the unlocked position and
      db) in the releasing position releases the locking element and
   e) a spring element which biases the locking element and in the releasing position of the blocking element moves the locking element from the unlocked position into the locked position,
   f) wherein the blocking element is configured to be moved by a friction force imparted by the belt rope on the blocking element to move the blocking element from the blocking position into the releasing position, the friction force being induced by the actuator.

* * * * *